US005924385A

United States Patent [19]

Cossel

[11] Patent Number: 5,924,385

[45] Date of Patent: Jul. 20, 1999

[54] CALF BIRTHING PEN

[76] Inventor: Tim Cossel, 870 McBride Creek Rd., Jordan Valley, Oreg. 97910

[21] Appl. No.: 08/882,689

[22] Filed: Jun. 25, 1997

[51] Int. Cl.[6] .................... A01K 29/00

[52] U.S. Cl. .................... 119/512; 119/519

[58] Field of Search .................... 119/507, 512, 119/519, 729, 732, 734, 751, 752, 725, 728

[56] References Cited

U.S. PATENT DOCUMENTS

| | | | |
|---|---|---|---|
| Re. 22,657 | 8/1945 | Babson et al. | 119/16 |
| 2,689,546 | 9/1954 | Petri | 119/14.03 |
| 2,786,449 | 3/1957 | La Roy Dahlerup | 119/734 |
| 2,814,271 | 11/1957 | Black | 119/55 |
| 3,828,733 | 8/1974 | Correia | 119/14.03 |
| 4,250,836 | 2/1981 | Smith | 119/512 |
| 4,366,775 | 1/1983 | Tyquin | 119/512 |
| 4,432,306 | 2/1984 | Rossa | 119/725 |
| 4,444,150 | 4/1984 | Hueftle et al. | 119/752 X |
| 4,630,570 | 12/1986 | Wilson et al. | 119/512 |
| 4,829,936 | 5/1989 | Mollhagen | 119/82 |
| 4,960,074 | 10/1990 | Wilson | 119/20 |
| 5,174,240 | 12/1992 | Darvill | 119/751 X |
| 5,383,425 | 1/1995 | Bleacher | 119/729 |
| 5,738,045 | 4/1998 | Bleacher | 119/751 |
| 5,752,472 | 5/1998 | Jubinville et al. | 119/728 |

*Primary Examiner*—Michael J. Carone
*Assistant Examiner*—James S. Bergin
*Attorney, Agent, or Firm*—Robert L. Shaver; Frank J. Dykas

[57] ABSTRACT

A transportable enclosure for restraining a cow during the birth of a calf, while giving a veterinarian free access to the rear of the cow, without clamping the neck or sides of the cow. A left, right and front gates are provided which swing open to release the cow. A nursing gate is provided to allow access to the cow by the calf for nursing after the birth. A cesarean section gate is also provided to allow access to the cow's abdomen for performing a C-section while the cow is restrained in the birthing pen. A pulling and lifting system is provided for assisting in pulling the calf from the cow and in lifting the calf off of the ground to drain mucous from the mouth, nose and lungs.

1 Claim, 5 Drawing Sheets

CALF BIRTHING PEN

BACKGROUND OF THE INVENTION

1. Field of the Invention

This invention relates to cattle enclosure pens, and more particularly to cattle enclosure pens for assisting in the birth of calves.

2. Background Information.

In a ranching operation, it is often necessary for a veterinarian or birthing helper to assist a cow in the birth of a calf. In many operations, assisting in the birth of a calf can take place in stalls in a barn or a similar permanent structure. However, many ranching operations occur over a large area, and herds of cattle can be distributed over a large expanse of land. In such a situation, it may be advantageous for the veterinarian or the birthing helper to go to where the cows are in order to assist in births.

A number of cow chutes are made which can be used for this purpose. They typically utilize panels which close on the cows neck and immobilize the cow by squeezing her neck and sometimes simultaneously squeezing her sides with the sides of the pen. This type of enclosure is called a squeeze chute. The problem with squeeze chutes is that a cow can panic when it finds itself trapped in a confining place with panels clamped on its neck so that it cannot turn around. The squeeze chute can also cut off air to a cow and cause it to pass out and "go down". The typical squeeze chute is also designed to immobilize a cow for a variety of operations, including immunization, branding, veterinary checks, and other operations. It is not specifically designed to meet the needs of a cow giving birth to a calf.

In such a situation it would be advantageous for the cow not to be clamped at the neck, but not to be able to turn around in the gate. There should be room behind the cow for the veterinarian or a helper to stand and to work. Ideally, there should also be a device for mechanically assisting in the delivery of the calf, which includes pulling the calf from the cow, and also lifting the calf into the air to allow mucous to drain from its mouth, nose and lungs. The calf birthing pen should also provide a way to continue restraint of the cow after the birth, but yet allow access to the cow by the calf for nursing. The calf birthing pen should also restrain the cow while allowing side access by a veterinarian for performing a cesarean section if that is necessary. The calf birthing pen should also have a restraint gate to prevent the cow from backing up, yet which allows open access to the rear of the cow for assisting in the birth of the calf. Preferably, the calf birthing pen should also be portable, but should be adjustable so that the calf birthing pen can sit flat on the ground when in operation. The calf birthing pen should also have a front end which opens to allow the release of the cow and sides which open to allow the release of the cow into adjacent pens.

Accordingly, it is an object of the invention to provide a calf birthing pen which restrains the cow without squeezing its neck or sides.

Another object of the invention is to provide a calf birthing pen which prevents the cow from turning around in the pen.

It is another object of the invention to provide a calf birthing pen which provides access to the cow at its rear end by a person assisting in the birth.

A further object of the invention is to provide a device for mechanically assisting in the delivery of the calf by pulling the calf from the cow and also by lifting the calf into the air to drain mucous from the mouth, nose and lungs.

It is a further object of the invention to provide a calf birthing pen which provides access to the cow by a calf, and yet continues to restrain the cow.

It is a further object of the invention to restrain the cow while allowing access to the cow's side by a veterinarian while performing a cesarean section.

Another object of the invention is to provide a calf birthing pen which is portable, and can be towed from place to place.

It is a further object of the invention to provide a calf birthing pen which allows the operator to release the cow from the pen, either by the front gate or by either of the side gates. It is a further object of the invention to provide a calf birthing pen which prevents the cow from backing up, yet allows easy access to the rear end of the cow by the veterinarian or the birthing assistant.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

According to the present invent on, the foregoing and other objects and advantages are attained by a portable calf birthing pen with a number of features which assist a veterinarian or a helper in the birthing process of a calf. The calf birthing pen is a structure which has a front gate which swings open or closed, a left and a right side gate which swings open or closed, and an entry side, into which a cow enters. Once a cow has entered, it is prevented from backing out by the use of a hinged first rear gate with a locking position which swings aside to allow the cow to enter, but prevents the cow from backing out. A second rear gate with limited swing can also be utilized, which also swings open when a cow enters, and has a locking position. The calf birthing pen also has a winch system for assisting in the birthing of a calf.

The calf birthing pen is provided on one side with a swing-open gate which is positioned to allow the calf to have access to a cow for the purpose of nursing. The calf birthing pen also has a gate positioned to allow a veterinarian or helper to perform a C-section on the cow while it is in the calf birthing pen. The calf birthing pen is transportable by the use of wheels and a towing tongue. The wheels can be raised, so that the calf birthing pen sits flat on the ground when in use. Shoulder bars are utilized in the calf birthing pen which restrain and confine the movements of a cow so that the cow can't turn around in the calf birthing pen, yet the shoulder bars do not clamp on the neck of a cow and there is therefore less likelihood of causing the cow to panic, with resultant kicking, fighting, choking and inability to stand. The calf birthing pen is provided with a winch and points of attachment for the winch, for pulling a calf by its front legs from the cow. A lifting arm is also provided which, when utilized with the winch, is adapted to lift a calf by its hind legs into the air so as to facilitate drainage of mucous from the nose, mouth and lungs of the calf.

The apparatus of the invention thus provides a calf birthing pen in which the cow is confined, but not clamped around the neck. Access to the rear of the cow is provided for a veterinarian or birthing helper, but the cow may not back out of the calf birthing pen. Access to the cow is provided for a nursing calf, and access to a side of the cow is provided in case a cesarean section is necessary. The calf birthing pen is portable by use of wheels and a tongue. The calf birthing pen is also provided with winch for pulling the calf from the cow, and a winch and lifting arm for lifting the cow into the air for the drainage of mucous. A number of points of attachment are provided for a pulley which is utilized in conjunction with the winch.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects-all without departing from the invention. Accordingly, the drawing and description are to be regarded as illustrative In nature, and not as restrictive.

DESCRIPTION OF THE PREFERRED EMBODIMENTS

Figure 1:
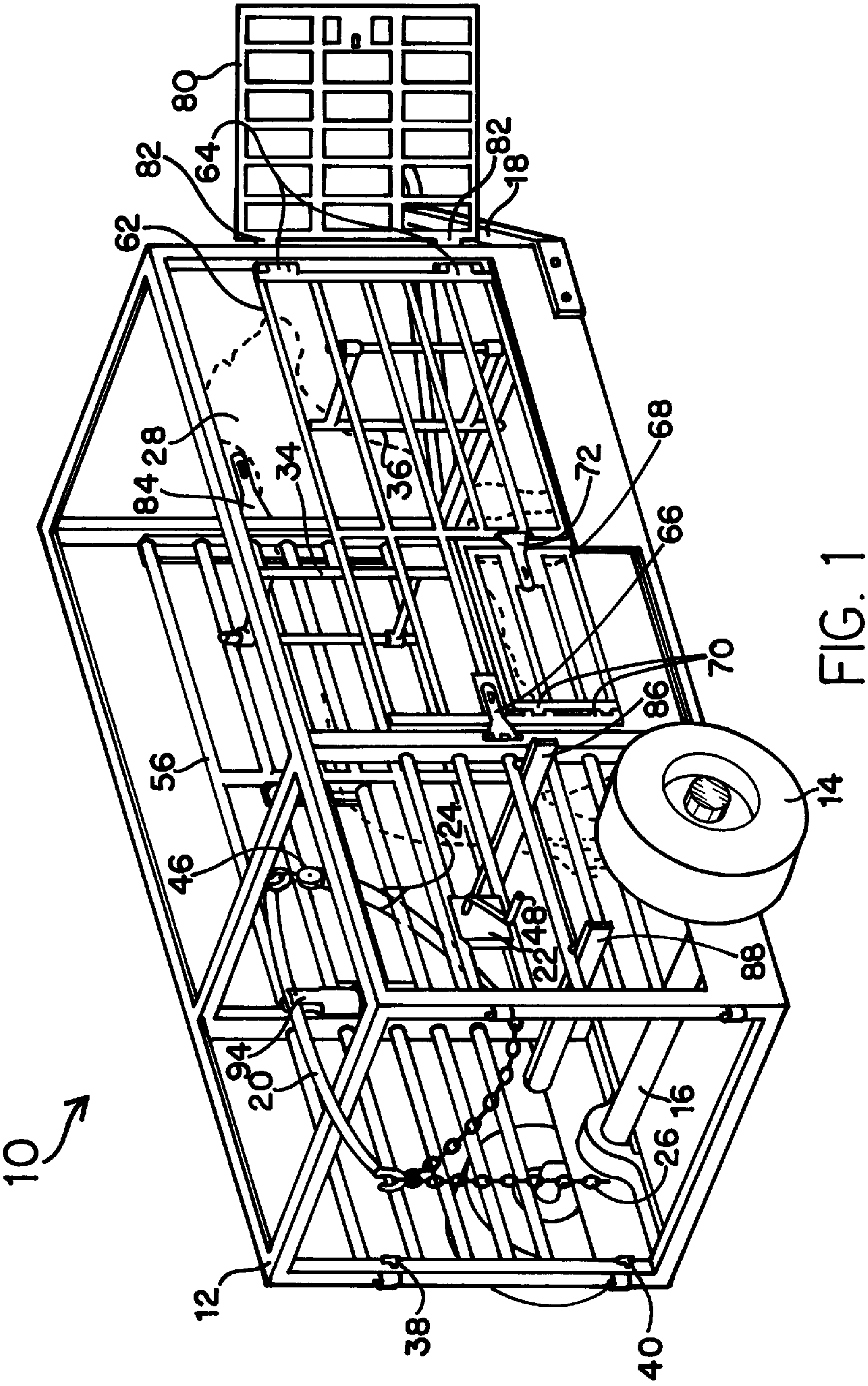
FIG. 1 is a perspective view of the calf birthing pen.

Referring to FIG. 1, the invention is shown to advantage. The calf birthing pen is generally referred to as 10, and includes a frame 12 on which is mounted a left side gate 56, a right side gate 62, and a front gate 80. The frame 12 is preferably made of steel, and can be tubular, channel, angled, or other shape. The left side gate 56, right side gate 62, and front gate 80 are shown made of tubular material, which is preferably steel, but other materials or shapes can be utilized, such as aluminum, wood, plastic, or other materials which would prove equally suitable. Mounted to frame 12 is axle 16, which has on either end attached a wheel 14. The wheels 14 can be positioned in an up or down position. In the down position, shown in FIG. 2, the calf birthing pen 10 is lifted off the ground, making the calf birthing pen 10 towable behind a vehicle. In the up position of the wheels 14, shown in FIG. 3, the calf birthing pen 10 and its frame 12 rest against the ground. At an end of the calf birthing pen 10 which is opposite to the wheels 14 is mounted a tongue 18 which includes a tongue jack 32. Preferably, the tongue 18 is removable from the frame 12. In order to swing open front gate 80, tongue jack 32 may be made so that it is either removable or rotates, in order to allow front gate 80 to open.

Figure 2:
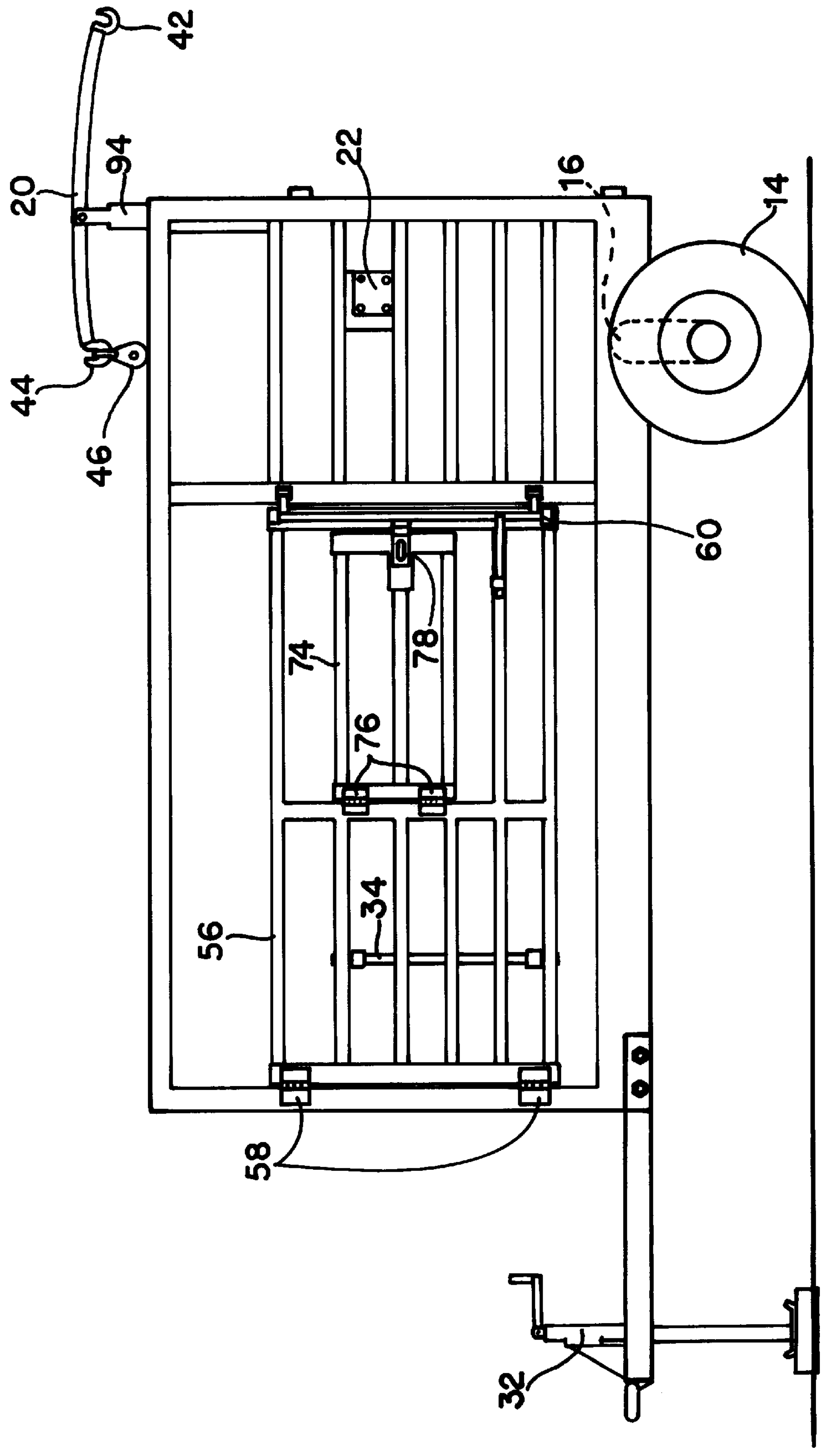
FIG. 2 is a side view showing the left side of the calf birthing pen.
Figure 3:
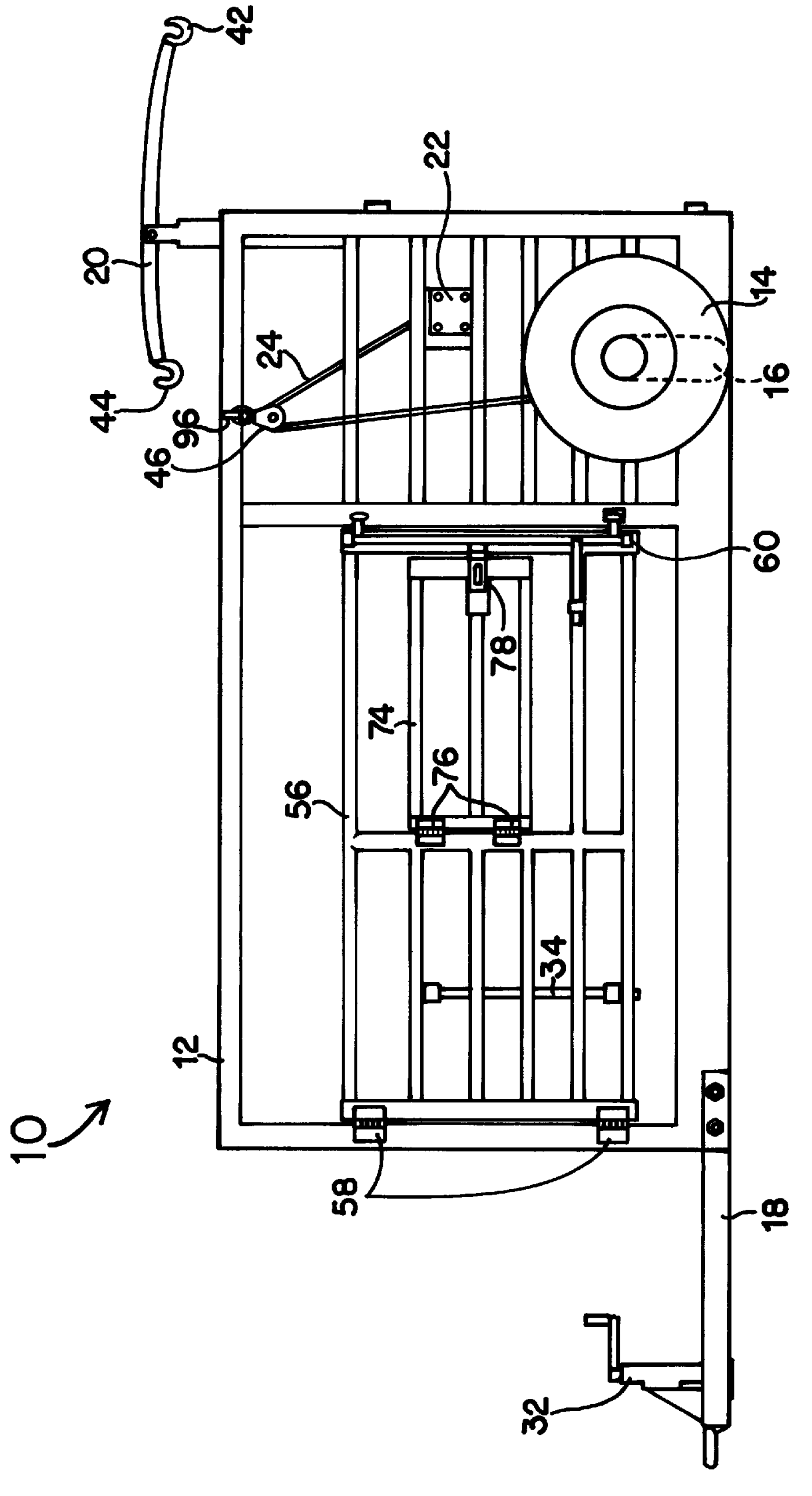
FIG. 3 is a side view showing the left side of the calf birthing pen; with the wheels and tongue jack raised so that the calf birthing pen sits flat on the ground.

When the calf birthing pen 10 is viewed from the end to which are attached wheels 14, the side of the calf birthing pen 10 which is on the viewer's left hand side is called the left side, and the side of the birthing pen 10 which Is on the viewer's right side is called the right side. Attached to the left side of the calf birthing pen 10 is a left side gate 56. Left side gate 56 attaches with hinges 58 and a latch 60. Left side gate 56 is best shown in FIGS. 2 and 3. Built into left side gate 56 is a C-section gate 74. C-section gate 74 attaches by hinges 76 and latch 78.

Right side gate 62 is best shown in FIG. 1. Right side gate 62 is attached to frame 12 using hinges 64 and latch 66. Built into right side gate 62 is a nursing gate 68. Nursing gate 68 attaches to right side gate 62 by the use of hinges 70 and latch 72. Front gate 80 attaches to frame 12 by the use of hinges 82 and latch 84.

Shown in FIG. 1 is hinged first gate 86 and hinged second gate 88. Also shown in FIG. 1 is a left shoulder block restraint 34 and a right shoulder restraint 36.

Also included in the calf birthing pen 10 is a lifting and pulling system, comprising a swiveling post 94, a lifting arm 20, a winch 22, a winch handle 48, a pulley 46, a cable 24, and a chain 26. There is also a first pulley hook 96 and a second pulley hook 98.

In operation, use of the calf birthing pen 10 may begin when the calf birthing pen 10 is in the travel configuration as shown in FIG. 2. In this configuration, the wheels 14 are down and locked in place, and the tongue 18 is raised above the ground using tongue jack 32. In this position, the calf birthing pen 10 may be attached to a vehicle and transported to the place where it is to be used. Once in the field, the calf birthing pen 10 can be converted to the operational configuration as shown in FIG. 3. In this configuration, the wheels 14 are up and the tongue jack 32 is retracted. The tongue jack 32 can be removed from the tongue at this point or rotated to its horizontal position (not shown). These adjustments to the tongue jack 32 would improve the ability to open front gate 80. Tongue 18 may also be removed from the calf birthing pen 10 at this time. One way by which the wheels 14 can be lowered or raised is by utilizing a cable 24 from winch 22 to attach to axle 16 and to lift or lower the wheels 14 in relation to the frame 12. In raising or lowering the wheels 14 in this way, the pulley 46 is attached to the first pulley hook 96 and the cable 24 run from the winch 22 to the axle 16. By turning the winch handle 48, the axle 16 would then be lifted or lowered in relation to frame 12. This operation is shown in FIG. 3.

After the calf birthing pen 10 has been lowered to the ground, a cow 28 would enter the calf birthing pen from the rear. The calf birthing pen could be set up so that it is part of a corral structure, and it could appear to the cow that the calf birthing pen 10 is an exit from the corral. In this way, the cow does not resist going into calf birthing pen 10. Once the cow 28 has entered calf birthing 10, a hinged second gate 88 is closed behind the cow. This hinged second gate prevents the cow from backing out of the calf birthing pen 10. The cow would then be encouraged to move further forward into the calf birthing pen, and a hinged first gate 86 would be closed behind the cow. At this point, the cow is well forward in the calf birthing pen 10, as shown in FIG. 1. Left shoulder restraint 34 and right shoulder restraint 36 would then be swung into place which would prevent the cow from turning around in the calf birthing pen. The hinged second gate could then be retracted, which would allow free access to the rear of the cow by a veterinarian or other birthing helper. From this position, the veterinarian or birthing assistant could assist in the delivery of a calf which, in certain situations, could include physically winching the calf from the cow.

Figure 4:
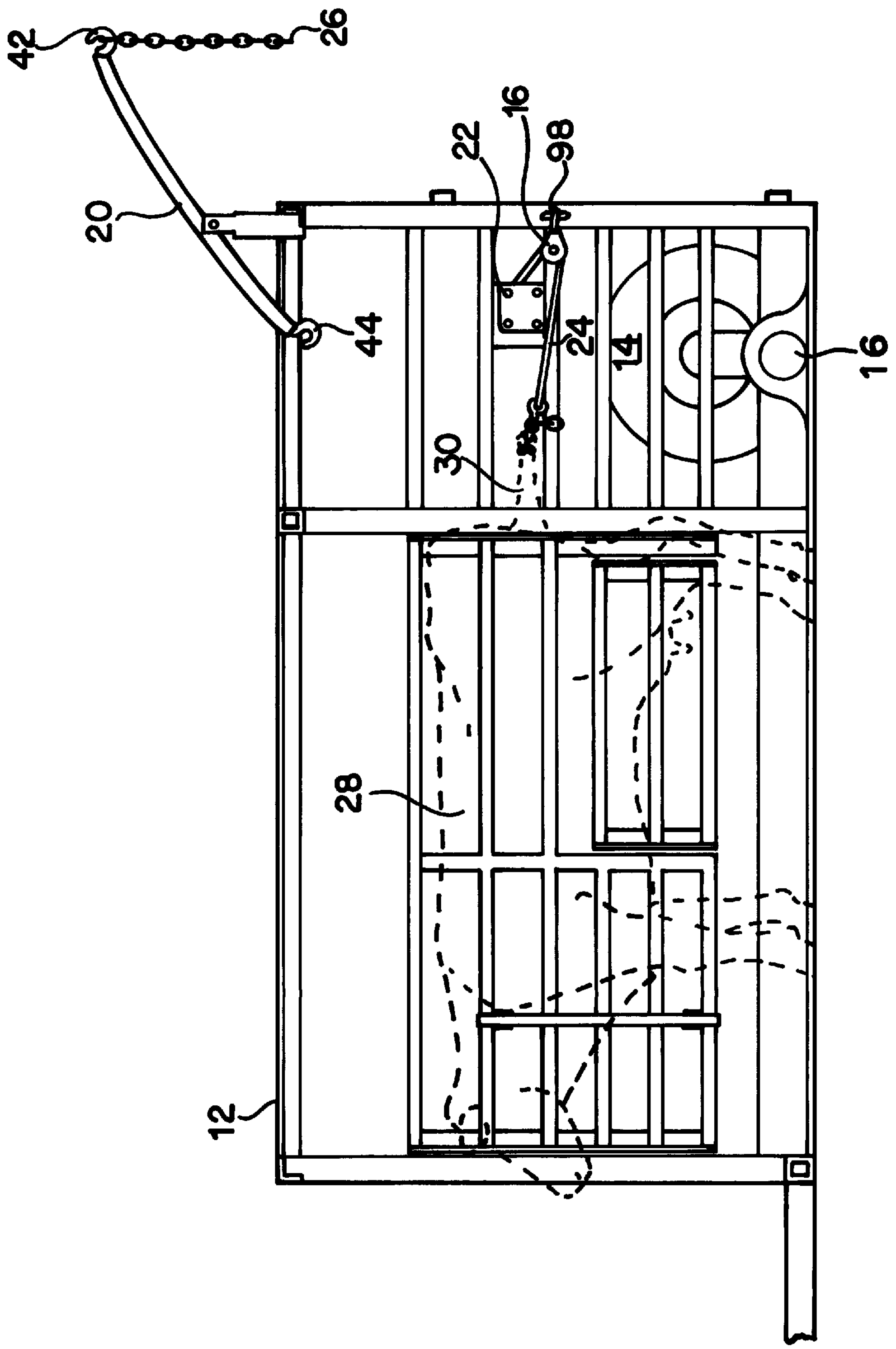
FIG. 4 is a side view of the calf birthing pen showing the left side of the calf birthing pen and the winch arrangement for assisting in the delivery of a calf.
Figure 5:
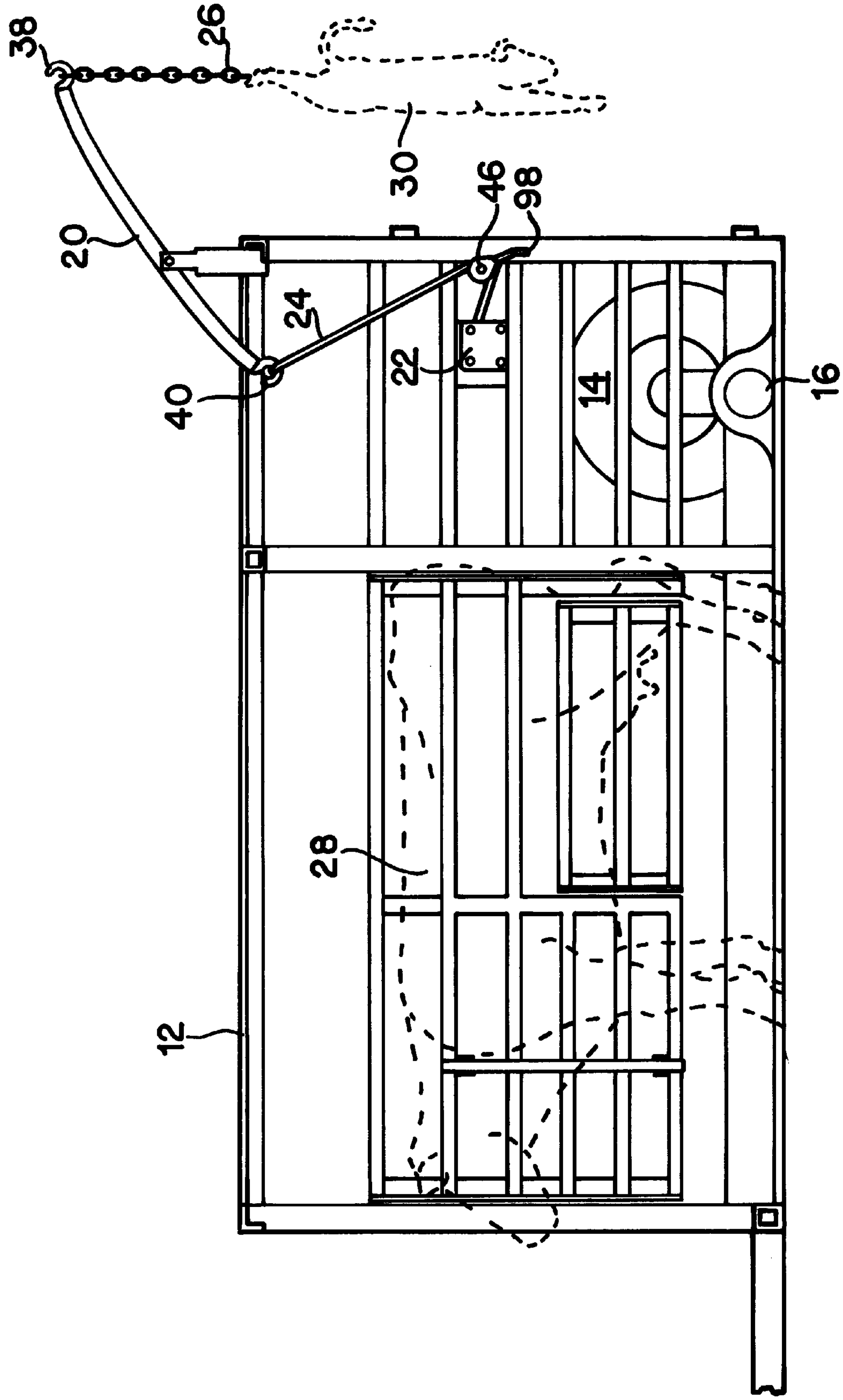
FIG. 5 is a side view of the calf birthing pen showing the left side of the pen and the winch configuration used for lifting the calf into the air to drain mucous from the lungs.

The physical set up of winching the calf from the cow is shown in FIG. 4. The pulley 46 is looped over a second pulley hook 98, and the cable 24 is extended around the front feet of the calf 30. The veterinarian or birthing helper can then turn winch handle 48 to carefully apply pressure to the front legs of the calf 30 and assist in pulling him out of the cow. Once out of the cow, the calf 30 would be gently lowered to the ground and if desired, the winching assembly could be set up as shown In FIG. 5 to lift the calf off the ground in order to drain mucous from the lungs. In this configuration, the pulley 46 remains on second pulley hook 98, but the cable 24 extends to the second lifting arm hook 40. From the first lifting arm hook 38, a chain 26 or cable 24 extends and is used to lift the calf by its hind legs into the air. During these operations, a softer material such as flat nylon webbing (not shown) can be attached to the end of the cable 24 or the chain 26 and used to grip the front or rear legs of the calf 30. Once the mucous has been drained from the nose, mouth and lungs of the calf, the winch 22 would be turned to lower the calf 30 to the ground where he would be released.

After the calf had been delivered, and while the cow is still restrained in the calf birthing pen, the calf could have access to the cow for nursing purposes by opening nursing gate 68, which is part of the right side gate 62. If a C-section were required, C-section gate 74, which is part of the left side gate 56, could be opened to allow access of the veterinarian or birthing helper to the appropriate region of the cow's abdomen for performing the C-section. After the birth of the calf, when the veterinarian or birthing assistant deems it appropriate, the front gate 80 could be opened to release the cow, or the left side gate 56 or the right side gate 62 could also be opened to release the cow.

While there is shown and described the present preferred embodiment of the invention, it is to be distinctly understood that this invention is not limited thereto but may be variously embodied to practice within the scope of the following claims.

I claim:

1. A calf birthing pen with a left and right side, and a front and rear side, for restraining a cow while she is giving birth to a calf, comprising:

a frame with attached front, left, and right side gates, in which said cow is confined in birthing or other procedures;

a left side gate which is hingedly attached to said frame and configured to be long enough so that a cow may exit to the left side, and which swings open to allow the release of a cow to the left side;

a right side gate which is hingedly attached to said frame and configured to be long enough so that a cow may exit to the right side, and which swings open to allow the release of a cow;

a nursing gate built into a left or right side gate which is positioned to allow a calf to nurse while a cow remains restrained in said calf birthing pen;

a cesarean section gate built into said left side gate which is positioned adjacent a rear, upper quadrant of a restrained cow to allow a cesarean section to be performed on a cow restrained in the calf birthing pen;

a front side gate which is hingedly attached to said frame and which swings open to allow exit of the cow from said calf birthing pen;

a hinged first gate with locking position which is mounted on said frame and which said cow passes when entering said calf birthing pen from the rear and approaching said front side after passing through a hinged second rear gate, said hinged first gate for positioning a cow toward the front of the birthing pen;

said hinged second rear gate with limited swing, which is mounted on said frame and which said cow passes when entering said calf birthing pen from the rear and approaching said front side, said hinged second gate for allowing a cow to enter, but preventing a cow from backing out of the birthing pen;

a left and right shoulder bar which are attached to a left and right side of said frame, which adjustably extend from said frame toward said neck of said cow, which confine side to side movements of a cow in the calf birthing pen but can prevent said cow from backing out of said calf birthing pen without applying pressure to the cow's neck;

a dual purpose winch system which can be configured for assisting in the birthing of a calf for lifting traveling wheels into position for travel, which comprises a winch, one or more pulleys which configure said winch to pull horizontally for assisting in birthing a calf, one or more pulleys which configure said winch to pull vertically for lifting a calf for mucous drainage, one or more pulleys which configure said winch for raising or lowering said traveling wheels, a calf lifting arm for lifting a calf vertically, and a winch cable;

two or more traveling wheels attached to said frame which can be raised and lowered by said winch system, for transportation of said calf birthing pen; and a tongue attached to said frame for attachment of said calf birthing pen behind a vehicle for towing.

* * * * *